United States Patent
Egorov et al.

(10) Patent No.: US 10,691,817 B2
(45) Date of Patent: Jun. 23, 2020

(54) ENCRYPTION FOR DISTRIBUTED STORAGE AND PROCESSING

(71) Applicant: ZeroDB, Inc., Santa Clara, CA (US)

(72) Inventors: Mikhail Egorov, Santa Clara, CA (US); MacLane Scott Wilkison, Mountain View, CA (US); David Nuñez, Santa Clara, CA (US); Isaac Agudo, Malaga (ES)

(73) Assignee: ZeroDB, Inc., Santa Clara, CA (US)

( * ) Notice: Subject to any disclaimer, the term of this patent is extended or adjusted under 35 U.S.C. 154(b) by 241 days.

(21) Appl. No.: 15/588,614

(22) Filed: May 6, 2017

(65) Prior Publication Data

US 2017/0323114 A1 Nov. 9, 2017

Related U.S. Application Data

(60) Provisional application No. 62/332,840, filed on May 6, 2016.

(51) Int. Cl.
  *G06F 21/00* (2013.01)
  *H04L 29/06* (2006.01)
  (Continued)

(52) U.S. Cl.
  CPC ........ *G06F 21/6218* (2013.01); *G06F 21/602* (2013.01); *H04L 9/0618* (2013.01);
  (Continued)

(58) Field of Classification Search
  CPC ..... G06F 21/6218; G06F 21/602; H04L 9/14; H04L 63/0435; H04L 9/0894; H04L 9/0618; H04L 9/3228; H04L 9/16
  See application file for complete search history.

(56) References Cited

U.S. PATENT DOCUMENTS

2008/0059414 A1  3/2008 Cristofor
2014/0082749 A1* 3/2014 Holland ............... G06F 21/645
                                                                   726/29
(Continued)

FOREIGN PATENT DOCUMENTS

WO     2014/100788 A2    6/2014
WO  WO-2019204426 A1 * 10/2019  .......... H04L 9/3073

OTHER PUBLICATIONS

Giuseppe Ateniese, Kevin Fu, Matthew Green, Susan Hohenberger; "Improved proxy re-encryption schemes with applications to secure distributed storage"; ACM Transactions on Information and System Security (TISSEC), vol. 9, Issue 1, Feb. 2006, pp. 1-30 (Year: 2006).*

(Continued)

*Primary Examiner* — Shewaye Gelagay
*Assistant Examiner* — Courtney D Fields
(74) *Attorney, Agent, or Firm* — Pillsbury Winthrop Shaw Pittman, LLP

(57) ABSTRACT

Provided is a process of securing data in a distributed storage and processing application, the process including: obtaining a cluster of computing nodes, wherein: the cluster stores a plurality of ciphertexts; accessing a transformation key with a first computing node; transforming the ciphertext with the first computing node based on the transformation key into a transformed ciphertext configured to be decrypted with a temporary access key; decrypting the transformed ciphertext with the second computing node based on the temporary access key to obtain plaintext data.

33 Claims, 7 Drawing Sheets

(51) Int. Cl.

| | |
|---|---|
| *G06F 21/62* | (2013.01) |
| *G06F 21/60* | (2013.01) |
| *H04L 9/14* | (2006.01) |
| *H04L 9/06* | (2006.01) |
| *H04L 9/08* | (2006.01) |
| *H04L 9/16* | (2006.01) |
| *H04L 9/32* | (2006.01) |
| *G06Q 20/36* | (2012.01) |
| *G06Q 20/38* | (2012.01) |

(52) U.S. Cl.
CPC .............. *H04L 9/0894* (2013.01); *H04L 9/14* (2013.01); *H04L 9/16* (2013.01); *H04L 9/3228* (2013.01); *H04L 63/0435* (2013.01)

(56) References Cited

U.S. PATENT DOCUMENTS

| | | |
|---|---|---|
| 2014/0245390 A1 | 8/2014 | Clay |
| 2015/0067243 A1 | 3/2015 | Salessi et al. |
| 2015/0229619 A1* | 8/2015 | Costa .................. H04L 63/0823 713/171 |
| 2015/0270957 A1 | 9/2015 | Uzun |
| 2016/0004877 A1* | 1/2016 | Hayes ................. G06F 21/6218 713/165 |
| 2016/0014095 A1 | 1/2016 | Strayer et al. |

OTHER PUBLICATIONS

International Search Report and Written Opinion for Related PCT Application PCT/US2017/031479, dated Jul. 24, 2017, pp. 1 to 12.
European Office Action in related EP Application No. 16790180.0 dated Mar. 2, 2020 (6 pages).
European Search Report in related European Application No. 17793531. 9dated Mar. 18, 2020 (7 pages).
Nunez, David et al. "Delegated Access for Hadoop Clusters in the Cloud," 2014 IEEE 6th International Conference on Cloud Computing Technology and Science, IEEE, Dec. 15, 2014 (Dec. 15, 2014) (Dec. 15, 2014) pp. 374-379.
Boneh Dan et al., "Key Homomorphic PRFs and Their Applications" Aug. 18, 2013 (Aug. 18, 2013) International Conference on Financial Cryptography and Data Security (Lecture Notes in Computer Science; Lect. Notes Computer), Springer Berlin, Heidelberg, pp. 410-428.

* cited by examiner

ENCRYPTION FOR DISTRIBUTED STORAGE AND PROCESSING

CROSS-REFERENCE TO RELATED APPLICATIONS

This patent claims the benefit of U.S. Provisional Patent Application 62/332,840, titled ENCRYPTION FOR DISTRIBUTED STORAGE AND PROCESSING, filed 6 May 2016. The entire content of each earlier-filed application to which priority is claimed is hereby incorporated by reference for all purposes.

BACKGROUND

1. Field

The present disclosure relates generally to distributed computing and, more specifically, to encryption for distributed storage and processing applications.

2. Description of the Related Art

One class of cloud-computing involves clusters of computers that concurrently process very large sets of data, e.g., with Hadoop™, Spark™, Flink™, or Kafka™. Generally, these distributed processing frameworks or libraries distribute data among a set of computers (or other computational entities, like virtual machines or containers) in a cluster, often with redundant copies of the data being distributed among the computers, as none of the computers are trusted to not fail during a process. Often these systems process data concurrently, e.g., with MapReduce, to make operations on large data sets feasible. Given the large number of computers often used, and often variable demand for those computers, many users execute these applications in the cloud.

This architecture can give rise to undesirable tradeoffs. Generally, various highly regulated businesses would like to move more of their data onto the cloud, but they need to know that the cloud provider cannot access their data. This generally is true both for cloud storage and cloud processing of data. Further, when implemented in a public cloud, it is likely that the same computer will have data from different users, as it might perform some tasks for user A and other tasks for user B, possibly concurrently in different virtual machines on the same computer. This gives rise a number of security concerns. Example attacks might attempt a buffer overflow on a machine to execute code that allows an attacker to then read records from other users on that machine.

To mitigate these problems, some distributed processing and storage applications have implemented encryption. Often, encryption is performed with symmetric encryption keys managed by a key management server, in some cases, co-located with the computing devices by which the distributed processing and storage application is implemented. For instance, Hadoop 2.x introduced Transparent Data Encryption (TDE), which enables symmetric encryption at rest for data operated upon or stored by the Hadoop implementation. These existing attempts, like TDE, to mitigate the problems above, however, often leave the encryption keys stored in the data center and widely distributed among computing nodes, leaving a large attack surface.

Other approaches to mitigate the problem above give rise to other challenges. Encryption keys could be stored remotely from the computing devices by which the distributed processing and storage application is implemented, e.g., in a zero-knowledge architecture, where encryption keys are stored on separate, often remote, trusted computers exclusively, and encrypted data is sent to those computers for processing. However, performance can suffer in distributed processing and storage applications, where there are often many, highly-distributed attempts to access encrypted data. Sending encrypted blobs to a remote trusted computer to be decrypted and sent back can be prohibitively slow when done too often or for data sets that are too large.

Similar problems arise with key rotation, where data is encrypted with a new set of keys in case the old set of keys is compromised. With some forms of zero-knowledge solutions, the data is sent to a remote trusted computer to be decrypted with the old key and re-encrypted with a new key during a key rotation. But this can be problematic for big data cloud-implemented applications. Many data centers bill based on bandwidth used, so uploading and then downloading data to and from a remote trusted computer that decrypts and encrypts the data can consume excessive bandwidth and impose a high overhead. Moreover, due in part to these challenges with managing keys in zero-knowledge implementation, many existing approaches do not provide for fine-grained access control to data in the distributed processing and storage application.

SUMMARY

The following is a non-exhaustive listing of some aspects of the present techniques. These and other aspects are described in the following disclosure.

Some aspects include a process of securing data in a distributed storage and processing application, the process including: obtaining a cluster of computing nodes in a distributed storage and processing application, each computing node corresponding to one of a plurality of network hosts executing on a plurality of computing devices and with which the distributed storage and processing application is executed, wherein: the cluster stores a plurality of ciphertexts each redundantly stored on two or more of the plurality of computing devices, the ciphertexts are obtained by the distributed storage and processing application encrypted with a data-owner encryption key of a data owner that caused data in the ciphertexts to be loaded to the distributed storage and processing application, and the plurality of ciphertexts belong to at least part of a data set upon which a MapReduce job is being performed by the distributed storage and processing application; accessing a transformation key with a first computing node among the cluster of nodes in the distributed storage and processing application; transforming the ciphertext with the first computing node based on the transformation key into a transformed ciphertext configured to be decrypted with a temporary access key; accessing the transformed ciphertext and the temporary access key with a second computing node among the cluster of nodes in the distributed storage and processing application; decrypting the transformed ciphertext with the second computing node based on the temporary access key to obtain plaintext data; and performing a mapping task or a reducing task with the second computing node on the plaintext data; and storing a result of the mapping task or the reducing task in memory.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
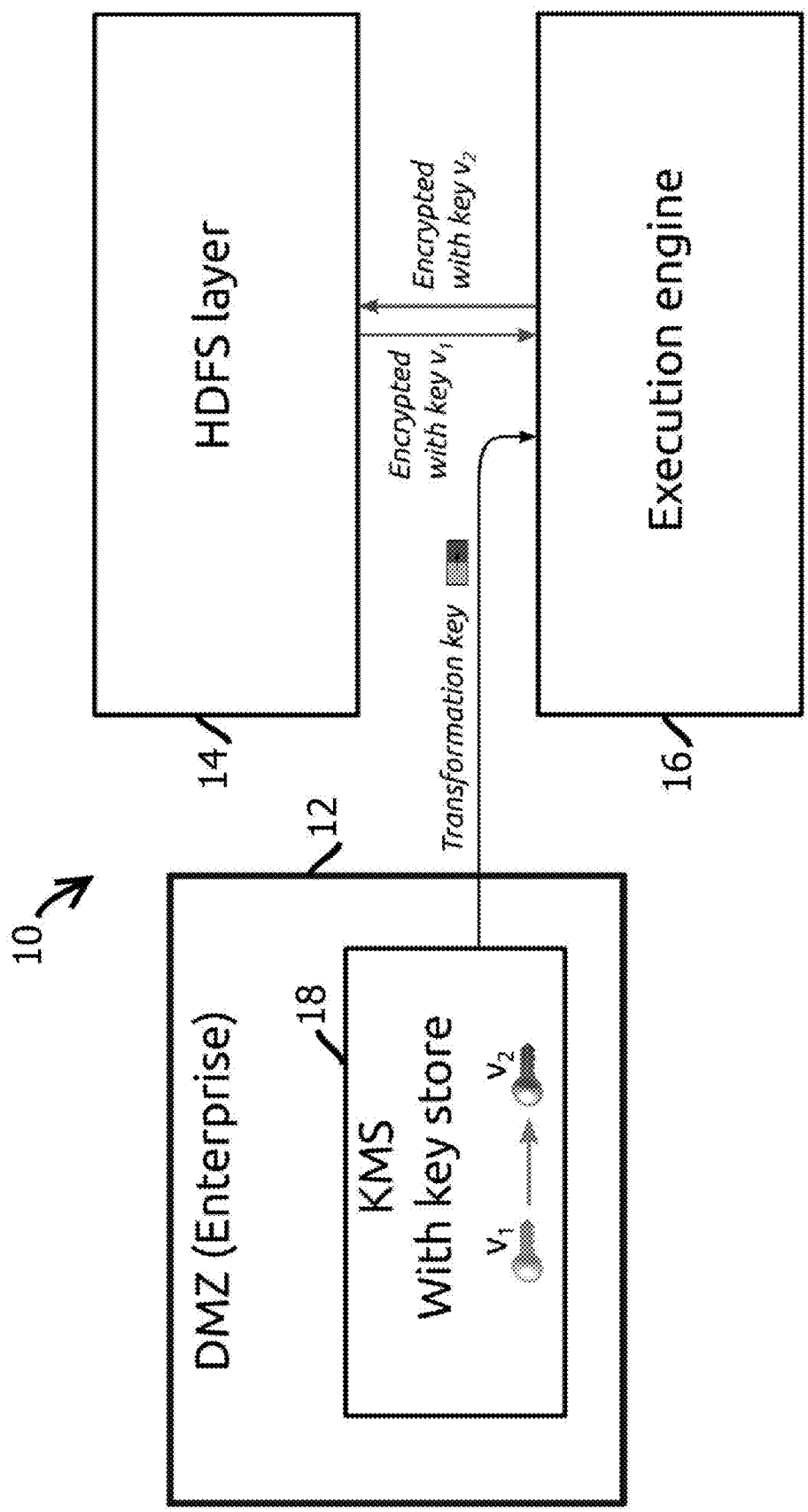
FIG. 1 shows an example of a logical architecture of a distributed processing and storage application performing key rotation in accordance with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of computer science and cryptography. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

As noted, many existing approaches to encrypting data in distributed storage and processing applications do not adequately address key rotation. Old ways of doing this often involve transferring the data to a trusted computer and then decrypting the data with the old key and then re-encrypting the data with the new key. But this is slow when the data is in the cloud and a user is trying to keep the untrusted cloud in a zero-knowledge state. And cloud providers often charge for network bandwidth used to upload and download the data. (None of which is to suggest that such approaches are disclaimed or cannot be used in conjunction with the present techniques.)

One approach to mitigate this issue with key rotation for cloud-hosted encrypted data is use of hybrid encryption systems, where data is encrypted with a key, that key is then itself encrypted, and the encryption by which the key is accessed is subject to key rotation. This approach mitigates the problem above when the number of encryption keys is relatively small. But this approach often does scale to the number of keys needed for fine-grained allocation of selective access to data, e.g., where different data is encrypted with different keys, and then those different keys are distributed to entities authorized to access the subset of the data encrypted with that key. In these architectures, the volume of data consumed by just the keys can be relatively large, and the issues discusses above re-emerge as the data is subdivided into finer-grained segments with different keys. Such systems may have a huge number of symmetric keys to process (e.g., in some cases, more data than is encrypted in the first place).

To mitigate this problem, some embodiments use proxy re-encryption to implement a form of key rotation. Some embodiments: 1) generative a new (replacement) public/private key pair; 2) create a transformation key with proxy re-encryption based on the old public key and the new public key; 3) instruct the untrusted computers in the cloud to encrypt the data with the transformation key, so that the new private key can read the data and the old private/public key can be deleted. Of note, in some embodiments, the data is transformed without downloading the data to a trusted computer, on the untrusted computers of a public cloud, and without the untrusted computers having the data owner's private key by which they can access the full set of data.

Further, the proxy re-encryption techniques are used in some embodiments to selectively grant access on a relatively fine-grained basis. Embodiments have different pieces of data encrypted with different derived keys, allowing different entities (e.g., processes or jobs in Hadoop) to access different subsets of the data. For example, use cases may have a table with a billion rows and 200 columns, and a user may request an analysis in Hadoop™ on only 2 of those columns. In this scenario, some embodiments may implement different keys for just those two columns and only use those two keys for the task, leaving the rest of the data unexposed and reducing the system's attack surface.

Operations are described with reference to ciphertext and plaintext. In some cases, the plaintext may be workload data of the distributed processing and storage application (e.g., application state of the job being run), or the plaintext may be an encryption key (e.g., encrypted data encryption keys (EDEKs)) by which that workload data is encrypted. In some embodiments, for performance reasons, a symmetric key may be used to encrypt the workload data (e.g., a secret accessible to both sides), and the symmetric key may be conveyed with asymmetric key encryption (e.g., one side only knows the public key of the other side, who uses their private key to read the value encrypted with their public key, e.g., the symmetric key), which is then used to access the workload data.

A variety of proxy re-encryption algorithms may be used. Examples include those described in the following: Giuseppe Ateniese, Kevin Fu, Matthew Green, and Susan Hohenberger, "Improved Proxy Re-Encryption Schemes with Applications to Secure Distributed Storage," *Cryptology ePrint Archive*, at 2005/028; M. Blaze, G. Bleumer, and M. Strauss, "Divertible protocols and atomic proxy cryptography," *In Proceedings of Eurocrypt '98*, volume 1403, pages 127-144, 1998; and D. Nũ nez, I. Agudo, and J. Lopez, "Delegated Access for Hadoop Clusters in the Cloud," *IEEE International Conference on Cloud Computing Technology and Science* (CloudCom 2014), pp. 374-379, 2014, the contents of each of which are hereby incorporated by reference.

As noted, Apache Hadoop 2.x introduced Transparent Data Encryption [TDE]. TDE provides symmetric encryption at rest for Hadoop File System (HDFS). Encryption at rest is an important measure for data security and compliance with PCI DSS, HIPAA, FICMA and other regulations. Unfortunately, standard TDE falls short in many aspects:

- TDE generally supports only symmetric encryption (AES). This means that every time partners are used as data sources, they have to ask the system's Key Management System (KMS) to encrypt data encryption keys (DEKs). Which means that the KMS has to be online all the time.
- Symmetric encryption can only be AES in unauthenticated CTR mode. This means that your data can be corrupted or deliberately changed while encrypted without you knowing.
- When the system analyzes the data, all the nodes which access that data constantly talk to the KMS. This means that the KMS should always be online, be very close to the Hadoop cluster and to be able to handle large numbers of requests per second. These requirements are very expensive or impossible to satisfy effectively if the desire is to keep KMS and encryption keys on premise. Hadoop deployed in a remote cloud with keys on premise will be simply slow.
- Key rotation is very hard to perform because systems cannot employ the Hadoop cluster for this task as it would expose old and new secret keys to all the machines in the cluster. Key rotation is not supported in Hadoop KMS (as well as Key Trustee KMS and Ranger KMS), manual workarounds are slow or insecure. But key rotation every 1-12 months is desirable for security, compliance with regulations and internal policies.

Some embodiments implement one of more of the techniques described herein to secure Hadoop™ or other distributed processing and storage applications, mitigating the above challenges in the following ways:

- Some embodiments support public key cryptography for encryption zones. In some cases, computational overhead in addition to AES is minimal.
- As a block cipher, some embodiments can use AES256 in authenticated GCM mode.
- Some embodiments delegate access to compute nodes in a cryptographically secure way using proxy re-encryption [PRE]. As a result, in some cases, compute nodes do not have to talk to the KMS while performing a job, so it does not matter how far the KMS is located from the cluster and whether the KMS can handle many simultaneous requests.
- Key rotation with some embodiments is executed relatively quickly, e.g., less than a minute, less than 10 seconds, and in some cases, less than a second. To effectuate key rotation, some embodiments use proxy re-encryption to delegate data to the system's "future" self.

An example of a logical architecture consistent with some embodiments is shown in FIG. 1. Some embodiments include a demilitarized zone (DMZ) 12, a Hadoop file system (HDFS) layer 14, and an execution engine 16, each of which may communicate with one another via one or more networks, such as a secure local area network or in some cases, the Internet, using protocols such as Internet Protocol (IP) and Transport Control Protocol (TCP). In some cases, the DMZ hosts a key management server (KMS) 18 with a key store having a plurality of encryption keys by which data is encrypted in the HDFS, e.g., by the data owner.

In some cases, the HDFS layer may distribute workload data across a plurality of computing nodes on a plurality of computing devices, with data stored redundantly on different computing devices in case one device fails. Other embodiments may use other distributed filesystems, like PVFS, Lustre, or GFS. Some embodiments may store filesystem metadata and workload (application) data separately, e.g., with the metadata stored on a NameNode and workload data stored on DataNodes. The NameNode may store a filesystem namespace tree hierarchy and a mapping of data blocks to the DataNodes. Some embodiments may include a single NameNode and more than 10, more than 100, or more than 1,000 DataNodes.

In some cases, the execution engine 16 may perform operations on the workload data specified in a job, such as mapping operations or reducing operations. In some embodiments, the execution engine is MapReduce or Tez™. Some embodiments may perform mapping operations in which filtering or sorting is performed concurrently on different subsets of the workload data by different computing nodes. Some embodiments may perform reducing operations by which the results of the mapping operations are aggregated or otherwise summarized, e.g., again with concurrent operations on different subsets of the results with different computing nodes in a cluster.

In some embodiments, these features may be implemented within the distributed processing and storage application described herein, using a plurality of the computing devices described with reference to FIG. 7, e.g., in a public or private cloud data center. Some embodiments secure a Hadoop™ distribution in such a way that, if an attacker hacks into any instance of the cluster, the attacker cannot gain anything beyond the information which the compromised instance is currently computing on. Moreover, unlike traditional TDE, some embodiments do not introduce any noticeable slowdown to jobs, no matter how far from the Hadoop deployment the encryption keys are stored. And some embodiments also provide near-instant key rotation.

In brief, some embodiments configure nodes in a Hadoop cluster to work on workload data without talking to the KMS (e.g., a remote KMS used in traditional Hadoop deployements). It, in some embodiments, generates temporary keys for some or all of the nodes and produces transformation keys for the HDFS layer, so that HDFS can transform selected data from being encrypted for the data owner into being encrypted for compute nodes. In some embodiments, the number of ciphertexts accessible with a different encryption key (e.g., EDEK's or other data owner keys) is relatively voluminous, such that fine-grained access may be granted to the different ciphertexts without granting access to the other ciphertexts. In some embodiments, the volume of such keys may be comparable to that of the data itself, in the extreme case with one or more keys per entry per field of data. In some embodiments, the volume of keys (e.g., measured in bytes) may be more than 2% that of the data encrypted with the keys, more than 5%, more than 20%, more than 50%, more than 80%, or more than 100%, depending on the resolution with which access (e.g., the ability to decrypt) is granted.

In some embodiments, cluster nodes do not need to send anything to the remote KMS, nor do they need to interact with the remote KMS while the job is executed. In some cases, the remote KMS may store private and public keys by which a data owner's data is encrypted. In some cases, an intermediary KMS described below may access and store these public keys to form transformation keys or temporary access keys described below.

Proxy re-encryption [PRE] is the basic primitive for how some embodiments secure Hadoop. PRE is a family of public key encryption algorithms, the first of which was introduced in 1998. In addition to usual functions for encryption and decryption, proxy re-encryption provides access delegation, so that a completely different private key can decrypt your data.

An explanation of proxy Re-encryption in Python-like pseudo-code follows. The preamble ">>>" indicates entry of a command and the absence of ">>>" indicates the response to the command.

Data owner has his own key pair:

```
>>> private_key = get_random_key( )
>>> public_key = get_public key(private_key)
```

Data is encrypted under the owner's public key, as is typical in public key cryptography:

```
>>> e_data = encrypt(public_key, data)
```

And the owner can decrypt it:

```
>>> data == decrypt(private_key, e_data)
```

True

Now, if a completely random person or process (e.g., an attacker) has its very own key pair, it cannot decrypt data encrypted under public_key:

```
>>> private_key_2 = get_random_key( )
>>> public_key_2 = get_public_key(private_key_2)
>>> private_key_2 == private key
```

False

```
>>> decrypt(private_key_2, e_data)
```

DecryptionError: Wrong key

But the owner of the data can enable the owner of a second key to read the data:

```
>>> t_key = get_transformation_key(private_key, public_key_2)
```

After that, in some embodiments, this transformation key t_key can be used to transform data where it is stored, e.g., without exposing any secret keys:

```
>>> e_data_2 = transform(t_key, e_data)
```

And then owner of private_key_2 can decrypt the data:

```
>>> data == decrypt(private_key_2, e_data_2)
```

Figure 2:
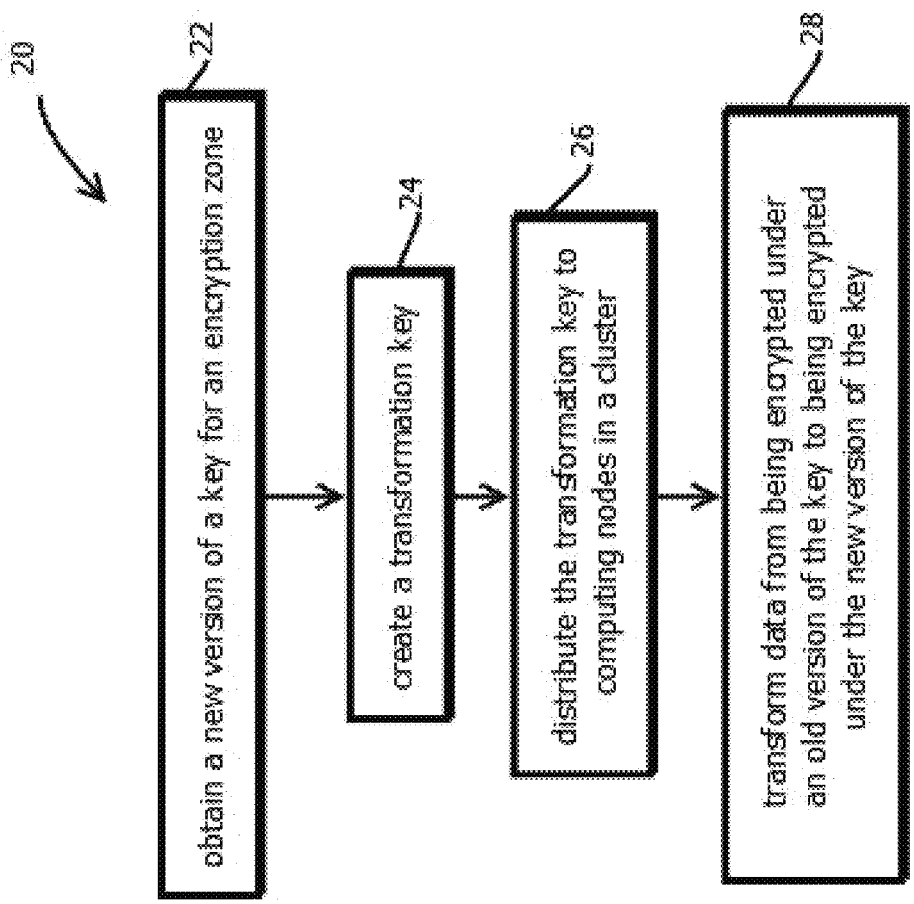
FIG. 2 shows an example of a process for key rotation that may be performed with a logical architecture of FIG. 1 in accordance with some embodiments of the present techniques.

FIG. 2 shows an example of a process 20 by which key rotation is achieved, e.g., with the architecture of FIG. 1. In some embodiments, key rotation is relatively simple once the insights described herein are implemented. After a new version of a key for an Encryption Zone is introduced (block 22), in some embodiments, the KMS creates a transformation key (block 24), which after being distributed to computing nodes of a cluster (block 26), allows an untrusted party (e.g., the computing nodes) to transform data from being encrypted under an old version to a new version of the key (block 28). In other words, the user shares their own data with their future self with proxy re-encryption.

Then, in some embodiments, the transformation key is given to the cluster. And the whole cluster is employed for doing key rotation. A typical 1000-node cluster can perform key rotation at a speed of 2 petabytes per second. During this process, in some embodiments, no encryption keys are exposed to the Hadoop deployment and the data is never decrypted. (Of course, hybrid implementations are also envisioned in which the present techniques are used alongside traditional approaches, and some data may be decrypted in the portions implementing the traditional approach.)

Some embodiments include a key management server (KMS) 18 that enables delegated access and is distinct from the Hadoop KMS, e.g., some embodiments may include two KMSs, with the present KMS sitting between the Hadoop KMS and computing nodes of the distributed storage and processing application, or some embodiments may replace the Hadoop KMS with the present KMS.

Figure 3:
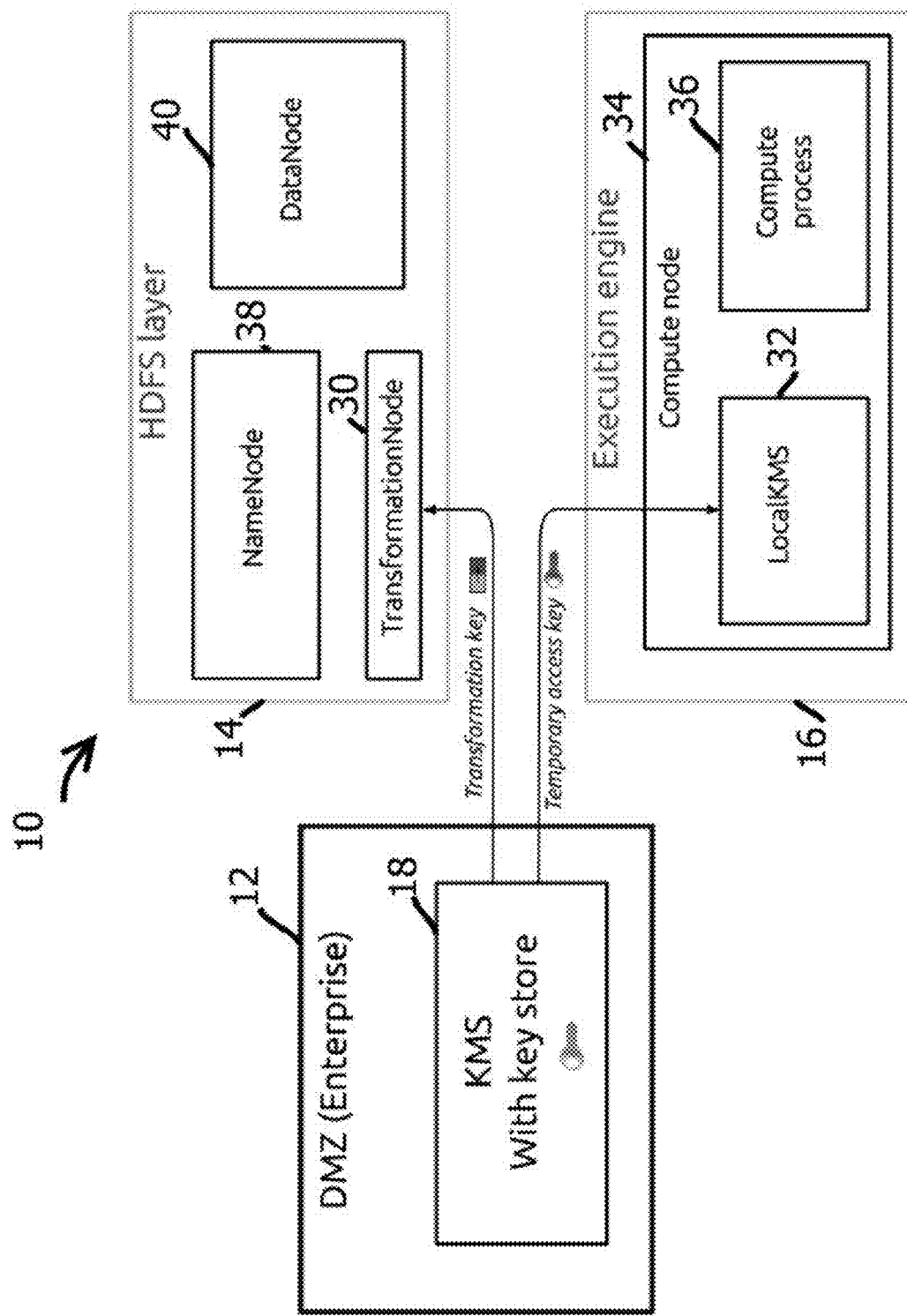
FIG. 3 shows an example of the logical architecture of FIG. 1 with greater detail depicting an example of delegated access being provided in accordance with some embodiments of the present techniques.

As shown in FIG. 3, unlike the typical Hadoop KMS, some embodiments have a KMS that communicates with the Hadoop cluster (e.g., by sending keys needed to access data) only when the KMS grants the permissions to execute the job being processed by the cluster in a cryptographically secure manner. In some cases, as shown in FIG. 3, these operations may be implemented with a TransformationNode 30 added to the HDFS layer and a LocalKMS 32 in the computing nodes 34 in support of computing processes 36, like mapping operations and reducing operations. As illustrated, and discussed above, the HDFS layer may include a NameNode 38 and DataNode 40 by which ciphertexts are accessed with the TransformationNode 30 and the computing node 34. Some embodiments may include substantially more computing nodes, e.g., more than 10, more than 100, or more than 1,000.

Before the cluster (of computing nodes constituting a Hadoop cluster in an instance of a distributed processing and storage application) executes the job (e.g., pipeline of one or more MapReduce operations on workload data), in some embodiments, the Key Management System 18 generates temporary encryption key pairs for some or all computing nodes in the cluster that will perform tasks in the job (e.g., with each node having its individual key pair (for instance, a public and private key in a public key encryption algorithm), and with different computing nodes having different key pairs). These temporary key pairs, in some embodiments, are transferred to the nodes 34 of the execution engine 16 over the network, e.g., with the transfer being secured by Transport Layer Security (TLS) communications between the KMS 18 and the nodes of the execution engine 16.

For each of those key pairs, in some embodiments, a transformation key is generated to grant permission to decrypt the data. These transformation keys may be deployed in the HDFS layer, e.g., by writing the key to designated locations in the distributed file system, in some cases, with keys being written to local memory of a computing node that will use the respective keys to access the data local to that computing node and perform operations on that data, or in some cases, the data or keys may be stored on a different computing node.

In some embodiments, when a node requests data from HDFS, blocks and files appear to the distributed processing and computing application as if they were encrypted under the node's temporary public key, e.g., in a manner that maintains compliance with the distributed processing and computing application's application program interface and data model. To maintain such compliance, while storing the data in a different format from that expected, HDFS layer nodes may transformed/re-encrypt the data prior to sending it to the execution engine, without having access to the encryption keys.

Figure 4:
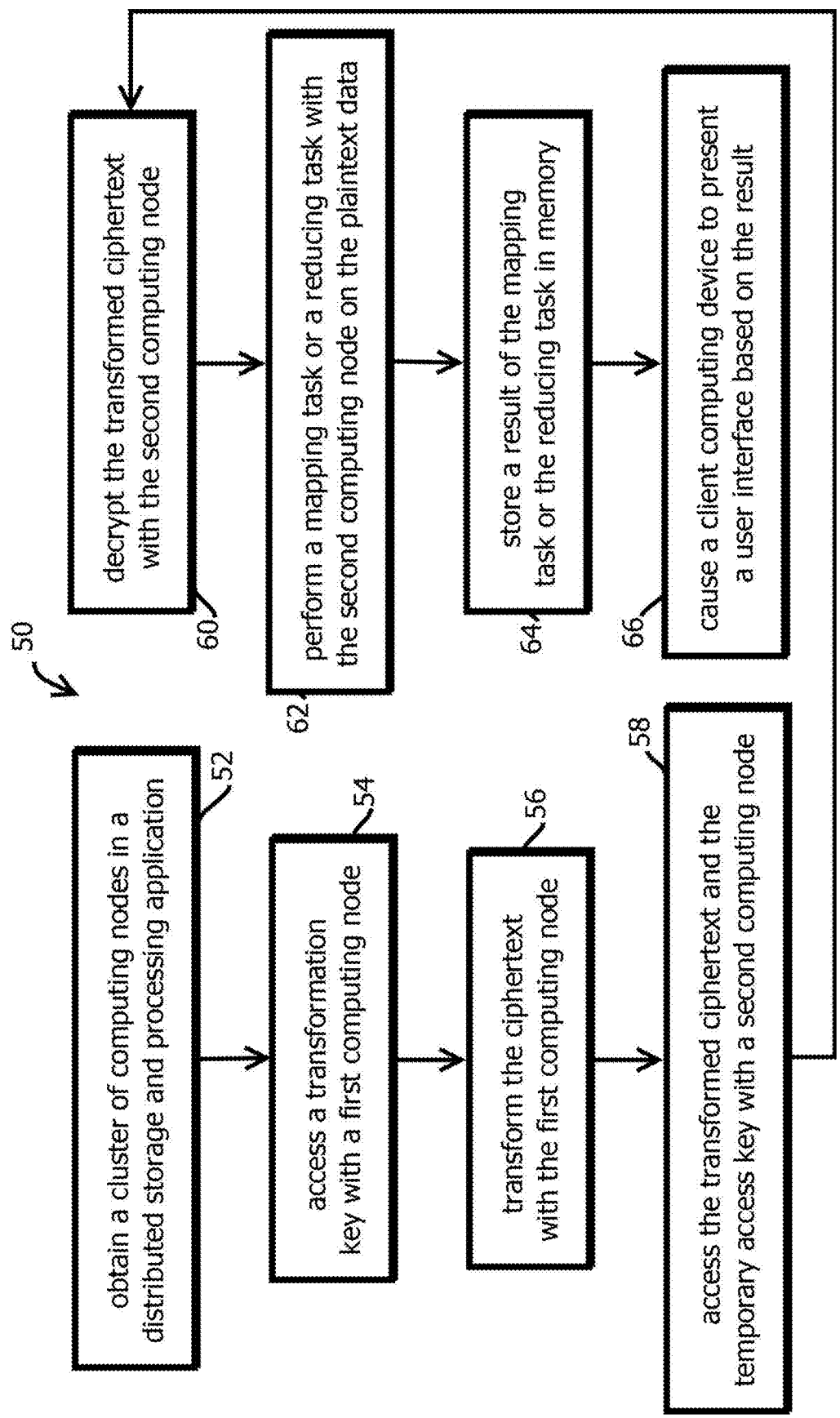
FIG. 4 shows an example of a process by which relatively fine-grained access to different subsets of encrypted data is provided with delegated access like that of FIG. 3 in accordance with some embodiments of the present techniques.

FIG. 4 shows an example of a process 50, which may be executed by the logical architectures described herein, to provide relatively fine-grained access control using the delegated access features discussed above. In some embodiments, the process 50 includes obtaining a cluster of computing nodes in a distributed storage and processing application, as indicated by block 52. In some cases, this may include one or more of the distributed storage and processing applications described herein, and in some cases, obtaining the cluster, may be performed by obtaining access to a cluster hosted on a remote data center.

Some embodiments include accessing a transformation key with a first computing node, as indicated by block 54. In some cases, accessing the transformation key may include accessing one of the above-described key management servers discussed above, such as a key management server operative to provide a transformation key for a proxy re-encryption algorithm like those discussed above.

Some embodiments include transforming the ciphertext with the first computing node, as indicated by block 56. In some cases, the ciphertext is workload data stored in one of the above-described data nodes, for instance, ciphertext formed with data encrypted with a data owner's encryption key or with one of the above-described key rotation keys. In some embodiments, transforming the ciphertext with the first computing node may include transforming the ciphertext with the transformation key, for example, based upon a public key of a second computing node discussed below. In some embodiments, the transformation may be performed without access to a private key by which the ciphertext is encrypted and without access to a private key corresponding to a public key of the second computing node. In some embodiments, the transformation may be performed without the first computing node having access to the unencrypted plaintext form of the ciphertext.

Some embodiments may access the transformed ciphertext and the temporary access key with a second computing node, as indicated by block 58. In some cases, the second computing node is a worker node in a computing cluster executing one of the above-described computing processes 36. In some cases, the temporary access key is accessed with a local key management server 32 like that discussed above. In some cases, the transformed ciphertext is accessed with the read operation described below with reference to FIG. 5, For instance by interfacing with the above-described NameNode 38 to identify which DataNode 40 that stores the transformed ciphertext.

Next, some embodiments may decrypt the transformed ciphertext with the second computing node, as indicated by block 60. In some cases, these operations 58-64 may be performed concurrently, for example, by more than 10, more than 100, or more than 1000 different computing nodes that serve the role of the second computing node. Similarly, the operations of block 54 and 56 may be executed concurrently, for instance, by different instances of the TransformationNode 30 described above.

Next, some embodiments may perform a mapping task or a reducing task with the second computing node on the plaintext data, as indicated by block 62.

Next, some embodiments may store a result of the mapping task or the reducing task in memory, as indicated by block 64. In some cases, this may include the below-described write operations of FIG. 6. In some embodiments, a sequence of mapping, then reducing, then mapping, then reducing tasks, and so on, the repeated, for example, in a pipeline.

Some embodiments may use the result of the MapReduce job for a variety of purposes. In some cases, the resulting data may be subject to further transformations, and some embodiments may cause a client computing device to present user interface based on the result, as indicated by block 66. In some cases, the client computing device may present a user interface in a web application or a native mobile application or desktop application.

In some embodiments, delegated access may be granted with relatively fine-grain control, for example, with different encryption keys being allocated to different computing nodes, such that the different computing nodes may access a subset of the present ciphertexts. For example, some embodiments may permit a given computing node to access a single column, or a single value of a single field with a single temporary access key suitable for that computing node (and only that computing node having a corresponding private key) to access that one and only value, or embodiments may group subsets of data in different ways, for example, by column, by row, by table, or the like, and provide access based upon these different subsets of data. Some embodiments may generate keys to access different subsets of data, such as the temporary access keys, for limited use, for example, on a job-by-job basis or on a task by task basis. In some cases, a given computing node may become compromised, but an adversary a may be prevented from accessing the full set of data based upon the above-describe segmentation with different encryption keys applying to different subsets of these ciphertext.

When HDFS clients read data encrypted with a block cipher and data encryption keys encrypted with a zone key (EDEKs) [TDE], they typically use the KeyProvider API to ask Hadoop KMS to decrypt EDEKs.

In contrast, with some embodiments, EDEKs are instead transformed by TransformationNodes to EDEK2 and sent for decryption to a local daemon (LocalKMS), which in some cases, provides the same KeyProvider API. The LocalKMS daemon may decrypt EDEK2 with the temporary private key it holds (after EDEKs are transformed by the HDFS layer) and give data encryption keys (DEKs) back to the local HDFS client that requested them.

In some embodiments, the HDFS client then uses DEKs to decrypt the data encrypted by the block cipher, similar to standard transparent data encryption.

By way of comparison, it is worth examining the sequence of events for reading an encrypted with both TDE (the standard Hadoop approach) and embodiments of the present techniques.

The sequence of events for reading an encrypted file with TDE includes the following:
1. The HDFS client calls open( ) to read a file.
2. The NameNode provides the EDEK to the client
3. The HDFS client passes the EDEK and EZK-id/version to the KMS.
4. The KMS requests the EZK from the key server.
5. The KMS decrypts the EDEK using the EZK.
6. The KMS provides the DEK to the HDFS client.
7. The HDFS client reads the encrypted data blocks, decrypting them with the DEK.

Figure 5:
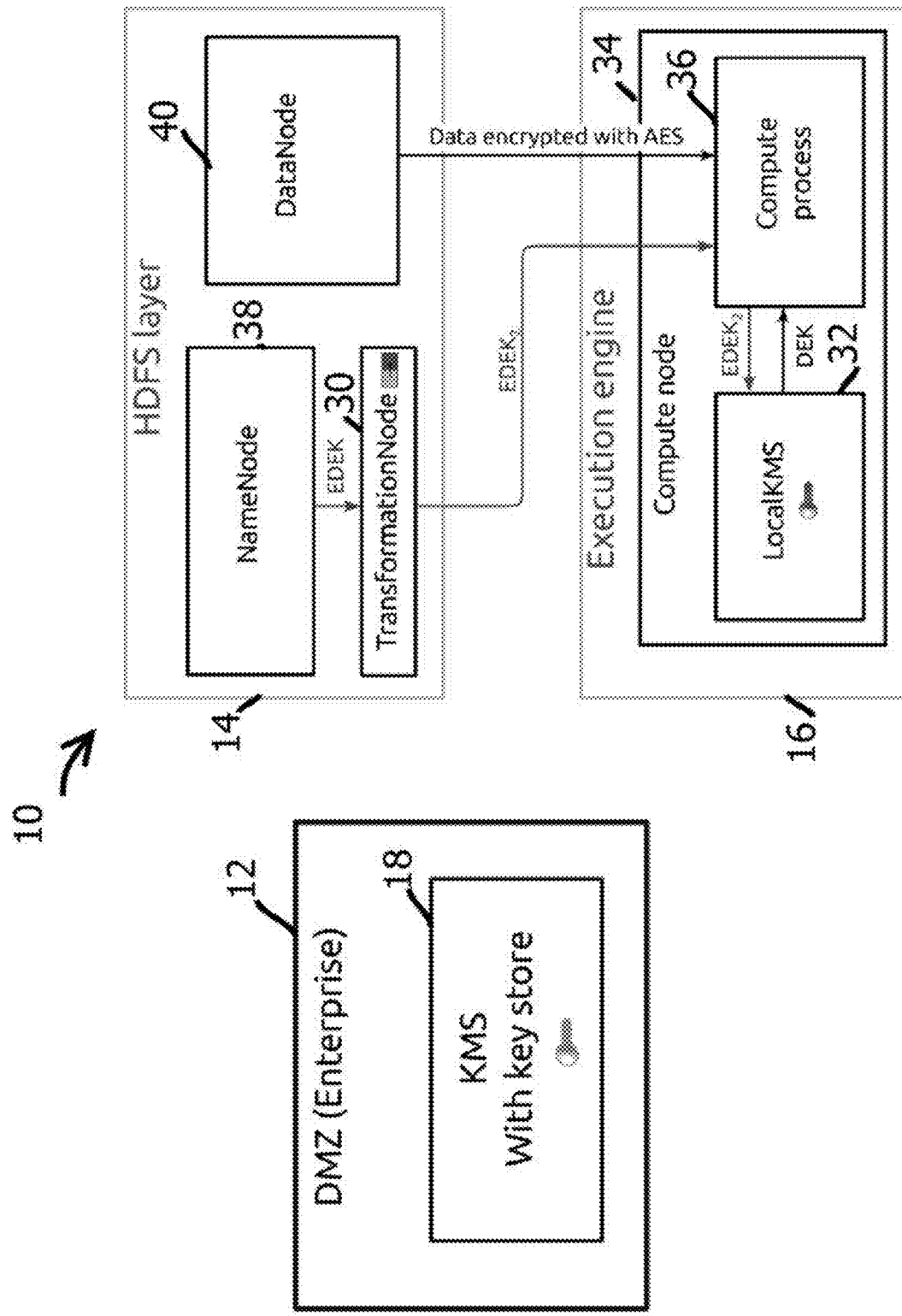
FIG. 5 shows the logical architecture of FIG. 1 with greater detail illustrating a read operation in accordance with some embodiments of the present techniques.

In contrast, the sequence of events for reading an encrypted file with embodiments of the present techniques are shown in FIG. 5 and include the following:
1. Before any reading happens, KMS gives transformation key to TransformationNode, generates and gives temporary key to LocalKMS.
2. The HDFS client calls open( ) to read a file.
3. The EDEK provided by NameNode is proxied and transformed by TransformationNode.
4. The HDFS client passes the EDEK and EZK-id/version to the LocalKMS.
5. The LocalKMS decrypts the EDEK using its temporary key.
6. The LocalKMS provides the DEK to the HDFS client.
7. The HDFS client reads the encrypted data blocks, decrypting them with the DEK.

In some embodiments, when an HDFS client writes data to HDFS, LocalKMS generates a random data encryption key (DEK), which the client uses to encrypt data with a block cipher algorithm (typically AES). If this node is allowed to save data to HDFS, the KMS of some embodiments gives LocalKMS the public key for the Encryption Zone. LocalKMS may encrypt DEK using this public key to produce an EDEK, and this EDEK gets transferred to a NameNode in the HDFS layer. There is no need for the HDFS cluster to communicate with the KMS of the present embodiment during this process.

By way of comparison, it is worth examining the sequence of events for writing an encrypted file with both TDE and embodiments of the present techniques.

The sequence of events for writing an encrypted file with TDE includes the following:
1. The HDFS client calls create( ) to write to the new file.
2. The NameNode requests the KMS to create a new EDEK using the EZK-id version.
3. The KMS generates a new DEK.
4. The KMS retrieves the EZK from the key server.
5. The KMS encrypts the DEK, resulting in the EDEK.
6. The KMS provides the EDEK to the NameNode.
7. The NameNode persists the EDEK as an extended attribute for the file metadata.
8. The NameNode provides the EDEK to the HDFS client.
9. The HDFS client provides the EDEK to the KMS, requesting the DEK.
10. The KMS requests the EZK from the key server.
11. The KMS decrypts the EDEK using the EZK.
12. The KMS provides the DEK to the HDFS client.
13. The HDFS client encrypts data using the DEK.
14. The HDFS client writes the encrypted data blocks to HDFS.

Figure 6:
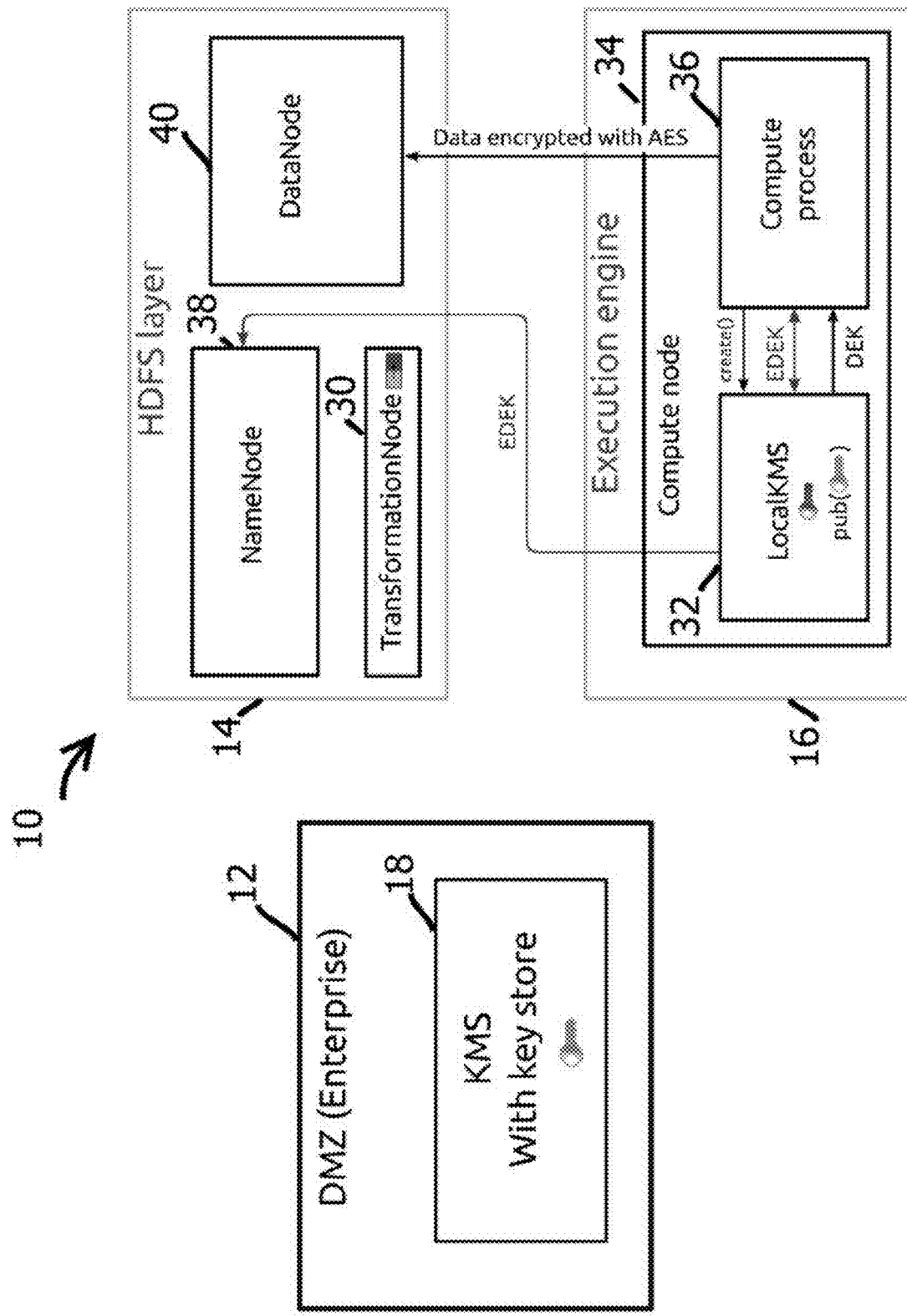
FIG. 6 shows the logical architecture of FIG. 1 with greater detail illustrating a write operation in accordance with some embodiments of the present techniques.

In contrast, the sequence of events for writing an encrypted file with embodiments of the present techniques are shown in FIG. 6 and include the following:
1. Before any writing happens, KMS gives LocalKMS public key for encryption zone.
2. The HDFS client calls create( ) to write to the new file.
3. LocalKMS on the same node as HDFS client generates new DEK.
4. LocalKMS encrypts DEK with the EZ public key.
5. LocalKMS provides EDEK to the NameNode.
6. The NameNode persists the EDEK as an extended attribute for the file metadata.
7. LocalKMS provides the EDEK to the HDFS client.
8. The HDFS client provides the EDEK to the LocalKMS, requesting the DEK.
9. LocalKMS gives back DEK it just encrypted to the HDFS client.
10. The HDFS client encrypts data using the DEK.
11. The HDFS client writes the encrypted data blocks to HDFS.

Operations are described with reference to ciphertext (the encrypted form of data) and plaintext (the unencrypted form of data, which may still be encrypted in cases where multiple layers of encryption are applied). In some cases, the plaintext may be workload data of the distributed processing and storage application (e.g., application state of the job being run), or the plaintext may be an encryption key (e.g., encrypted data encryption keys (EDEKs)) by which that workload data is encrypted. In some embodiments, for performance reasons, a symmetric key may be used to encrypt the workload data (e.g., a secret accessible to both sides), and the symmetric key may be conveyed with asymmetric key encryption (e.g., one side only knows the public key of the other side, who uses their private key to read the value encrypted with their public key, e.g., the symmetric key), which is then used to access the workload data.

Figure 7:
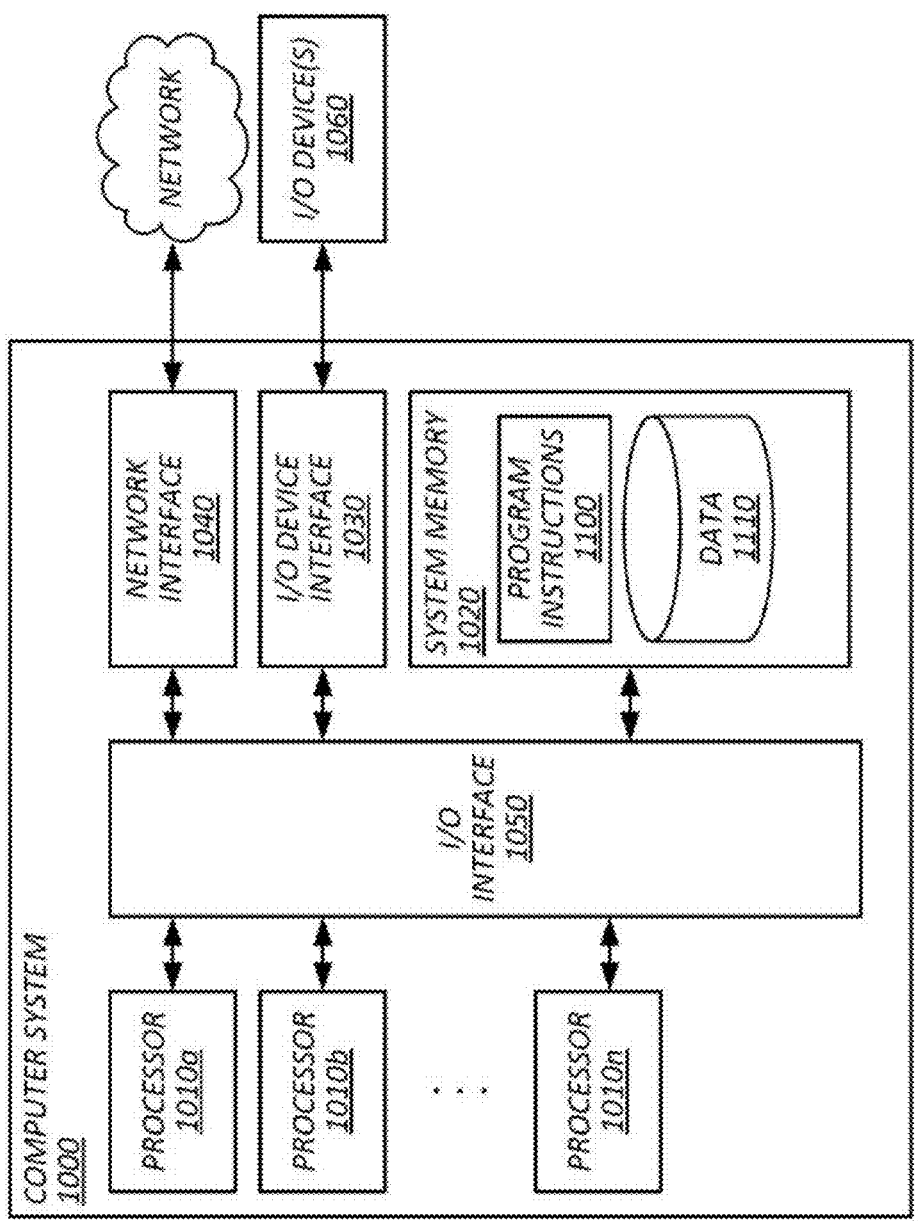
FIG. 7 shows an example of a computing device by which the above-described processes and systems may be implemented.

FIG. 7 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A method of securing data in a distributed storage and processing application, the method comprising: obtaining a cluster of computing nodes in a distributed storage and processing application, each computing node corresponding to one of a plurality of network hosts executing on a plurality of computing devices and with which the distributed storage and processing application is executed, wherein: the cluster stores a plurality of ciphertexts each redundantly stored on two or more of the plurality of computing devices, the ciphertexts are obtained by the distributed storage and processing application encrypted with a data-owner encryption key of a data owner that caused data in the ciphertexts to be loaded to the distributed storage and processing application, and the plurality of ciphertexts belong to at least part of a data set upon which a MapReduce job is being performed by the distributed storage and processing application; accessing a transformation key with a first computing node among the cluster of nodes in the distributed storage and processing application; transforming the ciphertext with the first computing node based on the transformation key into a transformed ciphertext configured to be decrypted with a temporary access key; accessing the transformed ciphertext and the temporary access key with a second computing node among the cluster of nodes in the distributed storage and processing application; decrypting the transformed ciphertext with the second computing node based on the temporary access key to obtain plaintext data; and performing a mapping task or a reducing task with the second computing node on the plaintext data; and storing a result of the mapping task or the reducing task in memory.

2. The method of embodiment 1, wherein: decrypting the ciphertext with the second computing node is performed by the second computing node without the second computing node interacting with a key management system executing on another computing device during the MapReduce job before decrypting.

3. The method of any one of embodiments 1-2, wherein transforming the ciphertext with the first computing node based on the transformation key into the transformed ciphertext configured to be decrypted with the temporary access key is performed by the first computing node without the first computing node having access to the given plaintext of the given ciphertext or decrypting the given ciphertext.

4. The method of any one of embodiments 1-3, wherein decrypting the transformed ciphertext with the second computing node is performed by the second computing node without the second computing node having access to the transformation key or one of the data-owner encryption keys sufficient to decrypt the ciphertext.

5. The method of any one of embodiments 1-4, wherein: the given ciphertext is encrypted with public key encryption; the first node transforms the given ciphertext based on a public key of the data owner; and the first node transforms the given ciphertext without having access to a private key of the data owner.

6. The method of embodiment 5, wherein: the transformed cypher text is encrypted with public key encryption; the first computing node transforms the given ciphertext based on a private key of the second node; and the first computing node transforms the given ciphertext without having access to a private key of the second computing node corresponding to the private key of the second computing node.

7. The method of any one of embodiments 1-6, comprising: rotating keys by which the computing nodes access plaintext of the plurality of ciphertexts without the distributed storage and processing application having access to the data owner keys and without requiring that the plurality of ciphertexts be re-loaded from a computer system that decrypts and re-encrypts the plurality of ciphertexts.

8. The method of embodiment 7, wherein key rotation includes creating a new transformation key, wherein the transformation key is not sufficient to decrypt any of the plurality of ciphertexts.

9. The method of embodiment 7, wherein key rotation includes creating a new transformation key and forming a plurality of transformed ciphertexts from the plurality of ciphertexts based on the transformation key.

10. The method of embodiment 9, wherein the plurality of transformed ciphertexts are formed concurrently by different ones of the plurality of computing nodes of the distributed storage and processing application.

11. The method of any one of embodiments 1-10, wherein: the distributed storage and processing application comprises a plurality of encryption zones; and the method comprises rotating encryption keys on an encryption-zone-by-encryption-zone basis.

12. The method of any one of embodiments 1-11, comprising rotating encryption keys by which the distributed storage and processing application accesses plaintext data in the plurality of ciphertexts at least in part by: generating a replacement public/private encryption key pair to replace an existing public/private encryption key pair with which the plurality of ciphertexts are accessible; creating a replacement transformation key with proxy re-encryption based on the existing public key and the replacement public key; and instructing untrusted computers in a data center executing the plurality of computing nodes to encrypt at least some of the plurality of ciphertexts with the replacement transformation key, such that the ciphertexts can be read with the replacement private key and cannot be read with the previous existing private key.

13. The method of embodiment 12, wherein: the least some of the plurality of ciphertexts are encrypted with the replacement transformation key without downloading the ciphertexts to a trusted computer, the least some of the plurality of ciphertexts are encrypted by the untrusted computers without the untrusted computers having the existing private key; and the least some of the plurality of ciphertexts are encrypted by the untrusted computers without the untrusted computers having access to plaintext of the least some of the plurality of ciphertexts.

14. The method of any one of embodiments 1-13, comprising: steps for rotating encryption keys.

15. The method of any one of embodiments 1-14, wherein: different subsets of the plurality of ciphertexts are encrypted based on different transformation encryption keys of a proxy re-encryption algorithm; and access is selectively granted to the different subsets of the plurality of ciphertexts with the different derived encryption keys, such that a given computing node having access to one of the different subsets of the plurality of ciphertexts at a given time does not have access to other ones of the different subsets of the plurality of ciphertexts.

16. The method of embodiment 15, wherein: access is selectively granted based on a first MapReduce job identifier of a first task for which access is provisioned; access is selectively denied based on a second MapReduce job identifier of a second task for which access is provisioned; and the first and second MapReduce jobs are executed concurrently with respect to one another.

17. The method of any one of embodiments 1-16, comprising: steps for selectively granting access to different subsets of the plurality of ciphertexts.

18. The method of any one of embodiments 1-17, wherein the distributed storage and processing application comprises: a master node configured to effectuate storage of the plurality of ciphertexts in a distributed file system and coordinate concurrent operations by other nodes among the plurality of nodes; a name node configured to coordinate storage of the plurality of ciphertexts in a distributed file system at the direction of the master node; a job tracker configured to coordinate mapping operations and reducing operations on worker nodes; a worker node comprising: a data node service responsive to commands from the name node to store a portion of the distributed file system on a computing device executing the worker node, and a task tracker service responsive to commands from the job tracker to effectuation mapping operations or reducing operations; a client node configured to receiving data and commands from a user of the distributed storage and processing application, interface with the master node, and provide results to the user.

19. The method of any one of embodiments 1-18, comprising: instructing a client computing device to present a user interface based on the stored result of the mapping task or the reducing task.

20. A tangible, non-transitory, machine-readable medium storing instructions that when executed by a data processing apparatus cause the data processing apparatus to perform operations comprising: the operations of any one of embodiments 1-19.

21. A system, comprising: one or more processors; and memory storing instructions that when executed by the processors cause the processors to effectuate operations comprising: the operations of any one of embodiments 1-19.

What is claimed is:

1. A method of securing data in a distributed storage and processing application, the method comprising:
    obtaining a cluster of computing nodes in a distributed storage and processing application, each computing node corresponding to one of a plurality of network hosts executing on a plurality of computing devices and with which the distributed storage and processing application is executed, wherein:
        the cluster stores a plurality of ciphertexts each redundantly stored on two or more of the plurality of computing devices,
        the ciphertexts are obtained by the distributed storage and processing application encrypted with a data-owner encryption key of a data owner that caused data in the ciphertexts to be loaded to the distributed storage and processing application, and
        the plurality of ciphertexts belong to at least part of a data set upon which a computing job is being performed by the distributed storage and processing application;
    accessing a transformation key with a first computing node among the cluster of nodes in the distributed storage and processing application;
    transforming the ciphertext with the first computing node based on the transformation key into a transformed ciphertext configured to be decrypted with a temporary access key, wherein transforming the ciphertext with the first computing node based on the transformation key into the transformed ciphertext configured to be decrypted with the temporary access key is performed by the first computing node without the first computing node having access to the given plaintext of the given ciphertext or decrypting the given ciphertext;
    accessing the transformed ciphertext and the temporary access key with a second computing node among the cluster of nodes in the distributed storage and processing application;
    decrypting, by the second computing node without the second computing node having access to the transformation key or a data-owner encryption key sufficient to decrypt the ciphertext, the transformed ciphertext with the second computing node based on the temporary access key to obtain plaintext data;
    performing a task with the second computing node on the plaintext data; and
    storing a result of the task in memory.

2. The method of claim 1, wherein:
    decrypting the transformed ciphertext with the second computing node is performed by the second computing node without the second computing node interacting with a key management system executing on another computing device during the computing job before decrypting.

3. The method of claim 1, wherein:
    the given ciphertext is encrypted with public key encryption;
    the first node transforms the given ciphertext based on a public key of the data owner; and
    the first node transforms the given ciphertext without having access to a private key of the data owner.

4. The method of claim 3, wherein:
    the transformed cypher text is encrypted with public key encryption;
    the first computing node transforms the given ciphertext based on a public key of the second node; and the first computing node transforms the given ciphertext without having access to a private key of the second computing node corresponding to the public key of the second computing node.

5. The method of claim 1, comprising:
rotating keys by which the computing nodes access plaintext of the plurality of ciphertexts without the distributed storage and processing application having access to corresponding data owner keys and without requiring that the plurality of ciphertexts be re-loaded from a computer system that decrypts and re-encrypts the plurality of ciphertexts.

6. The method of claim 5, wherein key rotation includes creating a new transformation key, wherein the transformation key is not sufficient to decrypt any of the plurality of ciphertexts.

7. The method of claim 5, wherein key rotation includes creating a new transformation key and forming a plurality of transformed ciphertexts from the plurality of ciphertexts based on the transformation key.

8. The method of claim 7, wherein the plurality of transformed ciphertexts are formed concurrently by different ones of the plurality of computing nodes of the distributed storage and processing application.

9. The method of claim 1, wherein:
the distributed storage and processing application comprises a plurality of encryption zones; and
the method comprises rotating encryption keys on an encryption-zone-by-encryption-zone basis.

10. The method of claim 1, comprising rotating encryption keys by which the distributed storage and processing application accesses plaintext data in the plurality of ciphertexts at least in part by:
generating a replacement public/private encryption key pair to replace an existing public/private encryption key pair with which the plurality of ciphertexts are accessible;
creating a replacement transformation key with proxy re-encryption based on the existing public key and the replacement public key; and
instructing untrusted computers in a data center executing the plurality of computing nodes to encrypt at least some of the plurality of ciphertexts with the replacement transformation key, such that the ciphertexts can be read with the replacement private key and cannot be read with the previous existing private key.

11. The method of claim 10, wherein;
the least some of the plurality of ciphertexts are encrypted with the replacement transformation key without downloading the ciphertexts to a trusted computer,
the least some of the plurality of ciphertexts are encrypted by the untrusted computers without the untrusted computers having the existing private key; and
the least some of the plurality of ciphertexts are encrypted by the untrusted computers without the untrusted computers having access to plaintext of the least some of the plurality of ciphertexts.

12. The method of claim 1, comprising:
steps for rotating encryption keys.

13. The method of claim 1, wherein:
different subsets of the plurality of ciphertexts are encrypted based on different transformation encryption keys of a proxy re-encryption algorithm; and
access is selectively granted to the different subsets of the plurality of ciphertexts with the different derived encryption keys, such that a given computing node having access to one of the different subsets of the plurality of ciphertexts at a given time does not have access to other ones of the different subsets of the plurality of ciphertexts.

14. The method of claim 13, wherein;
the computing job comprises a MapReduce job;
access is selectively granted based on a first MapReduce job identifier of a first task for which access is provisioned;
access is selectively denied based on a second MapReduce job identifier of a second task for which access is provisioned; and
the first and second MapReduce jobs are executed concurrently with respect to one another.

15. The method of claim 1, comprising:
steps for selectively granting access to different subsets of the plurality of ciphertexts.

16. The method of claim 1, wherein the task comprises a mapping task or a reducing task and the distributed storage and processing application comprises:
a master node configured to effectuate storage of the plurality of ciphertexts in a distributed file system and coordinate concurrent operations by other nodes among the plurality of nodes;
a name node configured to coordinate storage of the plurality of ciphertexts in a distributed file system at the direction of the master node;
a job tracker configured to coordinate mapping operations and reducing operations on worker nodes;
a worker node comprising:
a data node service responsive to commands from the name node to store a portion of the distributed file system on a computing device executing the worker node, and
a task tracker service responsive to commands from the job tracker to effectuation mapping operations or reducing operations; and
a client node configured to receive data and commands from a user of the distributed storage and processing application, interface with the master node, and provide results to the user.

17. The method of claim 1, comprising:
instructing a client computing device to present a user interface based on the stored result of the task.

18. A tangible, non-transitory, machine-readable medium storing instructions that when executed by one or more computing devices effectuates operations comprising:
obtaining a cluster of computing nodes in a distributed storage and processing application, each computing node corresponding to one of a plurality of network hosts executing on a plurality of computing devices and with which the distributed storage and processing application is executed, wherein:
the cluster stores a plurality of ciphertexts each redundantly stored on two or more of the plurality of computing devices,
the ciphertexts are obtained by the distributed storage and processing application encrypted with a data-owner encryption key of a data owner that caused data in the ciphertexts to be loaded to the distributed storage and processing application, and
the plurality of ciphertexts belong to at least part of a data set upon which a computing job is being performed by the distributed storage and processing application;
accessing a transformation key with a first computing node among the cluster of nodes in the distributed storage and processing application;

transforming the ciphertext with the first computing node based on the transformation key into a transformed ciphertext configured to be decrypted with a temporary access key, wherein transforming the ciphertext with the first computing node based on the transformation key into the transformed ciphertext configured to be decrypted with the temporary access key is performed by the first computing node without the first computing node having access to the given plaintext of the given ciphertext or decrypting the given ciphertext;

accessing the transformed ciphertext and the temporary access key with a second computing node among the cluster of nodes in the distributed storage and processing application;

decrypting, by the second computing node without the second computing node having access to the transformation key or a data-owner encryption key sufficient to decrypt the ciphertext, the transformed ciphertext with the second computing node based on the temporary access key to obtain plaintext data;

performing a task with the second computing node on the plaintext data; and storing a result of the task in memory.

19. The medium of claim 18, wherein:
decrypting the transformed ciphertext with the second computing node is performed by the second computing node without the second computing node interacting with a key management system executing on another computing device during the computing job before decrypting.

20. The medium of claim 18, wherein:
the given ciphertext is encrypted with public key encryption;
the first node transforms the given ciphertext based on a public key of the data owner; and
the first node transforms the given ciphertext without having access to a private key of the data owner.

21. The medium of claim 20, wherein:
the transformed cypher text is encrypted with public key encryption;
the first computing node transforms the given ciphertext based on a public key of the second node; and
the first computing node transforms the given ciphertext without having access to a private key of the second computing node corresponding to the public key of the second computing node.

22. The medium of claim 18, the operations comprising:
rotating keys by which the computing nodes access plaintext of the plurality of ciphertexts without the distributed storage and processing application having access to corresponding data owner keys and without requiring that the plurality of ciphertexts be re-loaded from a computer system that decrypts and re-encrypts the plurality of ciphertexts.

23. The medium of claim 22, wherein key rotation includes creating a new transformation key, wherein the transformation key is not sufficient to decrypt any of the plurality of ciphertexts.

24. The medium of claim 22, wherein key rotation includes creating a new transformation key and forming a plurality of transformed ciphertexts from the plurality of ciphertexts based on the transformation key.

25. The medium of claim 24, wherein the plurality of transformed ciphertexts are formed concurrently by different ones of the plurality of computing nodes of the distributed storage and processing application.

26. The medium of claim 18, wherein:
the distributed storage and processing application comprises a plurality of encryption zones; and
the method comprises rotating encryption keys on an encryption-zone-by-encryption-zone basis.

27. The medium of claim 18, the operations comprising rotating encryption keys by which the distributed storage and processing application accesses plaintext data in the plurality of ciphertexts at least in part by:
generating a replacement public/private encryption key pair to replace an existing public/private encryption key pair with which the plurality of ciphertexts are accessible;
creating a replacement transformation key with proxy re-encryption based on the existing public key and the replacement public key; and
instructing untrusted computers in a data center executing the plurality of computing nodes to encrypt at least some of the plurality of ciphertexts with the replacement transformation key, such that the ciphertexts can be read with the replacement private key and cannot be read with the previous existing private key.

28. The medium of claim 27, wherein:
the least some of the plurality of ciphertexts are encrypted with the replacement transformation key without downloading the ciphertexts to a trusted computer, the least some of the plurality of ciphertexts are encrypted by the untrusted computers without the untrusted computers having the existing private key; and
the least some of the plurality of ciphertexts are encrypted by the untrusted computers without the untrusted computers having access to plaintext of the least some of the plurality of ciphertexts.

29. The medium of claim 18, the operations comprising:
steps for rotating encryption keys.

30. The medium of claim 18, wherein:
different subsets of the plurality of ciphertexts are encrypted based on different transformation encryption keys of a proxy re-encryption algorithm; and
access is selectively granted to the different subsets of the plurality of ciphertexts with the different derived encryption keys, such that a given computing node having access to one of the different subsets of the plurality of ciphertexts at a given time does not have access to other ones of the different subsets of the plurality of ciphertexts.

31. The medium of claim 30, wherein:
the computing job comprises a MapReduce job;
access is selectively granted based on a first MapReduce job identifier of a first task for which access is provisioned;
access is selectively denied based on a second MapReduce job identifier of a second task for which access is provisioned; and
the first and second MapReduce jobs are executed concurrently with respect to one another.

32. The medium of claim 18, the operations comprising:
steps for selectively granting access to different subsets of the plurality of ciphertexts.

33. The medium of claim 18, wherein the task comprises a mapping task or a reducing task and the distributed storage and processing application comprises:
a master node configured to effectuate storage of the plurality of ciphertexts in a distributed file system and coordinate concurrent operations by other nodes among the plurality of nodes;

a name node configured to coordinate storage of the plurality of ciphertexts in a distributed file system at the direction of the master node;

a job tracker configured to coordinate mapping operations and reducing operations on worker nodes;

a worker node comprising:
- a data node service responsive to commands from the name node to store a portion of the distributed file system on a computing device executing the worker node, and
- a task tracker service responsive to commands from the job tracker to effectuation mapping operations or reducing operations; and a client node configured to receive data and commands from a user of the distributed storage and processing application, interface with the master node, and provide results to the user.

\* \* \* \* \*